US012644578B1

(12) United States Patent
Huang et al.

(10) Patent No.: US 12,644,578 B1
(45) Date of Patent: Jun. 2, 2026

(54) STAGE LIGHT FIXTURE WITH SUPERIMPOSED COLOR FILTERING ELEMENT

(71) Applicant: Guangzhou Haoyang Electronic Co., Ltd., Guangzhou (CN)

(72) Inventors: Qiancheng Huang, Guangzhou (CN); Lili Ao, Guangzhou (CN); Weikai Jiang, Guangzhou (CN); Wenzhong Qiu, Guangzhou (CN); Xindong Liu, Guangzhou (CN); Wenfei Huang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 19/006,560

(22) Filed: Dec. 31, 2024

(30) Foreign Application Priority Data

Nov. 29, 2024 (CN) ......................... 202411750998.7

(51) Int. Cl.
*F21V 9/08* (2018.01)
*F21W 131/406* (2006.01)

(52) U.S. Cl.
CPC ......... *F21V 9/08* (2013.01); *F21W 2131/406* (2013.01)

(58) Field of Classification Search
CPC ........... F21S 10/007; F21S 10/02; F21V 9/00; F21V 9/08
See application file for complete search history.

(56) References Cited

U.S. PATENT DOCUMENTS 4,984,143 A * 1/1991 Richardson ........... F21S 10/007 359/888
2006/0007686 A1* 1/2006 Hough ...................... F21V 9/08 362/293

FOREIGN PATENT DOCUMENTS

CN 112178590 A * 1/2021 ................ F21V 9/08
EP 2722581 A1 * 4/2014 ............ F21S 10/007
WO WO-9404951 A1 * 3/1994 ............ F21S 10/007

OTHER PUBLICATIONS

Innovation Q+ NPL Search (Year: 2025).*

* cited by examiner

*Primary Examiner* — Anabel Ton
(74) *Attorney, Agent, or Firm* — MUNCY, GEISSLER, OLDS & LOWE, P.C.

(57) ABSTRACT

A stage light fixture with a superimposed color filtering element, having a light head and a support holder. A color wheel is disposed along a light beam emission direction, and the color wheel is provided with a superimposed color filtering element. A driving device is further included for driving the color wheel to rotate and driving the superimposed color filtering element to switch into/out of the light beam. The superimposed color filtering element includes at least two superimposed color filters, each of the color filters has a transparent substrate, at least one side of each transparent substrate being provided with a monochromatic coating layer. The monochromatic coating layer has a colored region and an uncolored region. When the superimposed color filtering element is switched into the light beam, the colored regions of at least two monochromatic coating layers are simultaneously positioned in the light beam.

17 Claims, 7 Drawing Sheets

STAGE LIGHT FIXTURE WITH SUPERIMPOSED COLOR FILTERING ELEMENT

CROSS REFERENCE TO RELATED APPLICATIONS

The present application claims priority from Chinese Application No. CN 202411750998.7 filed on Nov. 29, 2024, all of which are hereby incorporated herein by reference.

TECHNICAL FIELD

The present disclosure relates to the technical field of stage light fixtures, in particular to a stage light fixture with a superimposed color filtering element.

BACKGROUND

As a light fixture applied for stage performance, a stage light fixture is frequently required to provide various color renderings. The more colors the lighting fixture can present, the richer and better the performance effects. To meet performance requirements, sometimes multiple colors need to be displayed in a single light spot. For the purpose of this, in the existing technology multiple small color filters with different colors are spliced together and simultaneously switched into the light path for use as a normal color filter. However, this method results in obvious splicing marks between the small color filters and obvious black separating lines between different colors in the light spot, which is significantly adverse on the visual appearance.

To address this situation, the method of coating different colors in different zones on the transparent substrate of a single-color filter is further proposed. Although this method can eliminate the black separating lines, it is limited by processing technology and usually has large manufacturing errors to cause unclear boundaries. In addition, this method incurs excessive costs due to its complex process and has difficulty in large-scale industrialization.

SUMMARY

The present disclosure seeks to provide a solution to the before-mentioned problems and offers additional benefits to the existing prior art, which will become apparent in the following description. The present disclosure particularly provides a stage light fixture with a superimposed color filtering element, which utilizes the principle of color superposition to achieve multiple colors simultaneously displayed in the light spot when the color wheel is switched into the light path.

According to the present disclosure, the stage light fixture with a superimposed color filtering element includes a light head and a support holder which are pivotally connected each other. The light head is internally provided with a light source for generating a light beam. A color wheel is disposed along a light beam emission direction, which is provided with a superimposed color filtering element. A driving device is further provided for driving the color wheel to rotate and driving the superimposed color filtering element to switch into/out of the light beam. The superimposed color filtering element includes at least two superimposed color filters, each color filter has a transparent substrate and a monochromatic coating layer disposed on at least one side of the transparent substrate. The monochromatic coating layer has a colored region and an uncolored region, and the superimposed color filtering element is configured in a way that at least portion of the colored region of each of at least two monochromatic coating layer is simultaneously switched into the light beam when the superimposed color filtering element is switched into the light beam.

The superimposed color filtering element in the present disclosure includes at least two superimposed color filters, and each color filter includes a transparent substrate, at least one side of the transparent substrate being provided with a monochromatic coating layer. Each monochromatic coating layer has a colored region and an uncolored region. With the color filters in a superimposed configuration, the colored regions of different color filters can be superimposed with each other or with uncolored regions, thereby creating multiple color combinations. This results in more vibrant colors during stage performances. Furthermore, since each monochromatic coating layer contains only a single color, the coating process thereof is simplified, thus reducing manufacturing costs. The colored regions of different color filters do not affect each other during the coating process, which forms clear and sharp color separation without black separating lines in the light spot finally projected. Additionally, the design of the regional distribution of colored regions and uncolored regions in the color filters further increase the overall color distribution combinations of the superimposed color filtering element, thereby creating more color effects. In use, the superimposed color filtering element along with the color wheel is driven by the driving device to move and switch into/out of the light path to achieve different coloring effects.

According to the present disclosure, it is preferable to design the color of the monochromatic coating layer by using the rule of three primary colors. In particular, the color of each monochromatic coating layer is one of cyan, magenta, and yellow, or one of red, green, and blue. The color mixture rule for the three primary colors of cyan, magenta, and yellow is based on subtractive color mixing, while the color mixture rule for the three primary colors of red, green, and blue is based on additive color mixing. With each set of primary colors providing distinct color contrast, strong visual impact for the audience can be achieved.

Advantageously, in order to increase versatility of color combinations, the colored region preferably includes at least one of a dark color unit, a light color unit, and a gradient color unit, or mixture thereof. This allows selection of the dark unit or light unit, or a combination of dark and light units, thereby increasing the versatility of color combinations.

As sector-like block arrangement provides enhanced visual appeal, the colored region of the monochromatic coating layer preferably forms a plurality of sector-like blocks sharing a common vertex.

In addition, to ensure that the color divisions of the superimposed color filtering element as a whole have a unified center along the light beam emission direction, the vertices of the sector-like blocks formed by the colored regions of all monochromatic coating layers lie in the same line. This makes the color distribution clear and organized rather than chaotic.

Further advantageously, when the superimposed color filtering element is switched into the light beam, a center of the light beam passes through the common or coincided vertex of the sector-like blocks formed by the colored region of the monochromatic coating layer. With this way, the final light spot can exhibit a visual effect where different color regions radiate outward from the center thereof.

In an advantageous embodiment, in order to ensure precise and predictable color control with superimposition of colored regions, no more than two colored regions are superimposed simultaneously along the light beam emission direction. This prevents unpredictable color results that could occur with multiple layer superimposition, and simplifies both the color design process and subsequent adjustments.

In order to enable more diverse color combination methods, a portion of the colored region on one monochromatic coating layer is superimposed with the colored regions on other monochromatic coating layers, and a remaining portion of the colored region is superimposed with the uncolored regions on all remaining monochromatic coating layers. Such easy way enriches the color design arrangement.

It is preferred that both sides of the transparent substrate each provides one monochromatic coating layer along the light beam emission direction, which can reduce the number of transparent substrates, as well as reducing the thickness of the superimposed color filtering element and ensuring clear imaging for all color separations.

According to a preferable embodiment of the present disclosure, the superimposed color filtering element includes three superimposed transparent substrates with one side of each transparent substrate provided with the monochromatic coating layer. In such configuration, three transparent substrates support three monochromatic coating layers, which can simultaneously provide three color combinations, so as to present richer color combinations, while maintaining an acceptable thickness for the superimposed color filtering element. Moreover, the process of applying monochromatic coating layers to a single side of each transparent substrate is also simpler.

Preferably, a plurality of superimposed color filtering elements may be disposed on the color wheel according to the present disclosure, one of the plurality of superimposed color filtering elements is selectively switched into the light beam by the driving device. In such way, different color combinations and arrangements of superimposed color filtering elements can be simultaneously set on a single color wheel, thereby providing more effect options for stage performances.

For preventing relative displacement between the color filters, Adjacent color filters are preferably fixed by adhesive bonding at their edges. The edge-fixing method further ensures that the adhesive does not affect the optical performance of the superimposed color filters, resulting in improved aesthetics and reduced installation time and cost.

More preferably, as carbonization and blackening of the color filters will block the light beam and affect optical performance, adjacent color filters are fixed by intermittent adhesive bonding at their edges. This way can avoid carbonization and blackening, that might occur in the case of large amounts of adhesive, caused by temperature rises when the light beam illuminates the color filters.

In order to further prevent dust or other foreign matters from entering the superimposed color filtering element, which could block the light beam and affect optical performance, a sealing adhesive is preferably provided at the outer periphery of the superimposed color filtering element to seal gaps between adjacent color filters.

For positioning and installation of the superimposed color filtering element, the color wheel has a light-transmitting hole corresponding to the superimposed color filtering element, a positioning groove is provided on an inner edge of the light-transmitting hole to receive the superimposed color filtering element.

In addition, the light head is further provided with a beam splitter which is able to be switched into/out of the light beam on a light-emitting side of the color wheel and rotatably fixed on a mounting plate through a pivot seat. The beam splitter can expand a single light beam into multiple beams, achieving beam splitting or diffusion. The combined use of the beam splitter and the superimposed color filtering element can bring rich and dynamic optical effects for stage performances, thus realizing multi-colored variations and dynamic effects of the light beam.

Further advantageously, the number of beam splitters is preferably two or more, each beam splitter corresponds to one pivot seat, and at least two of the beam splitters are configured to be superimposed and simultaneously positioned in the light beam. The combination of two or more layers of beam splitters can further enhance light dispersion effect, with superimposed refraction effects of the beam splitters, thereby producing more pronounced spectral separation and displaying more brilliant and rich colors.

REFERENCE SIGNS

Figure 1:
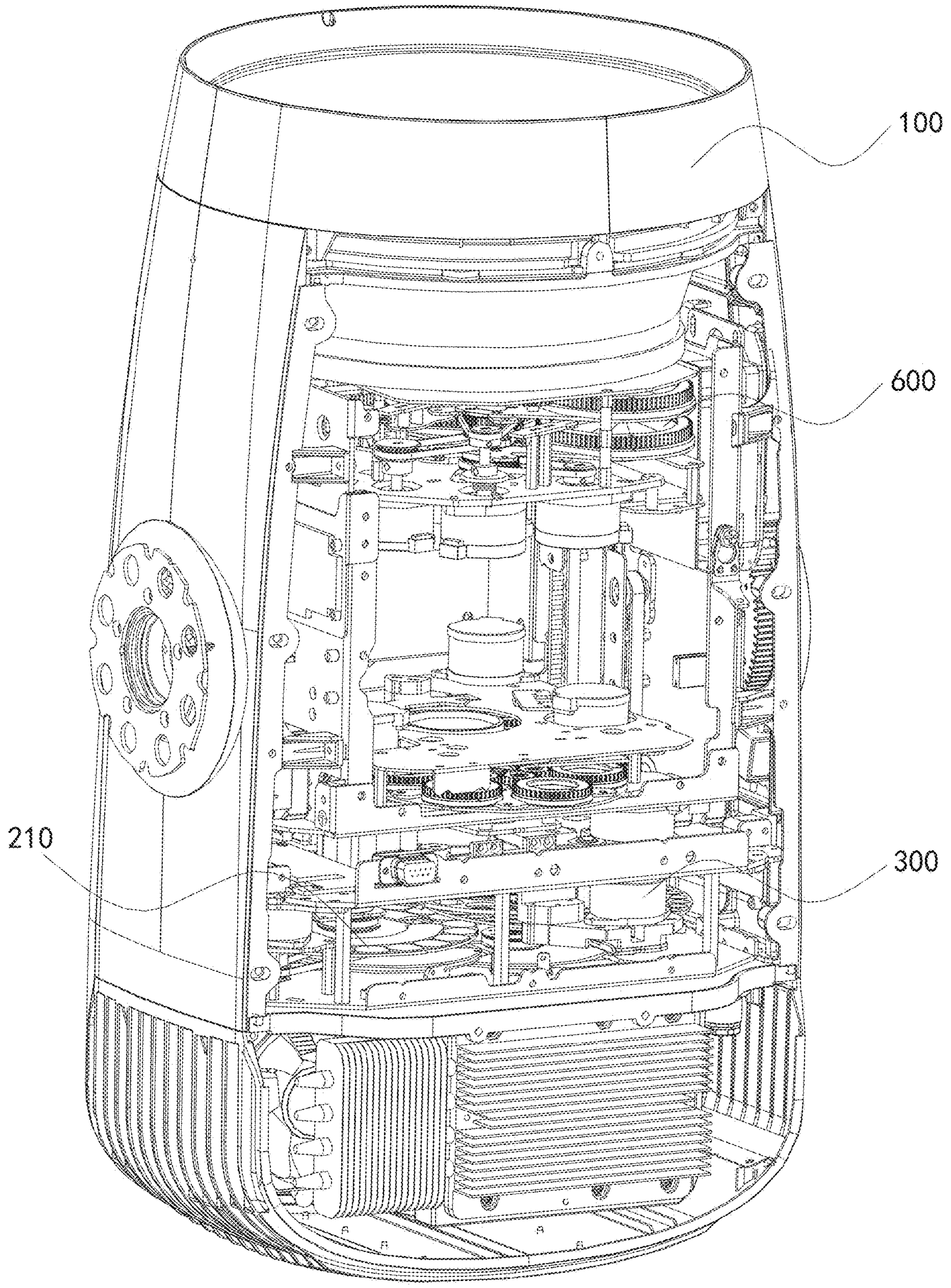
FIG. 1 is a structural schematic view of a stage light fixture with a superimposed color filtering element according to an embodiment of the present disclosure.

100 light head, 110 light source, 200 color wheel, 210 superimposed color filtering element, 220 color filter, 230 transparent substrate, 240 monochromatic coating layer, 250 colored region, 260 uncolored region, 270 first coating layer, 280 second coating layer, 290 third coating layer, 241 #1 block, 242 #2 block, 243 #3 block, 244 #4 block, 245 #5 block, 246 #6 block, 247 #7 block, 248 #8 block, 300 drive motor, 400 light-transmitting hole, 500 positioning groove, 600 beam splitter.

DETAILED DESCRIPTION OF THE EMBODIMENTS

The drawings are used only for exemplary illustration and cannot be understood as limitations to the present disclosure. For better explanation of the embodiments, some components in the drawings may be omitted, enlarged, or reduced, and do not represent actual product dimensions. For those skilled in the art, some well-known structures and their descriptions may be omitted as they are understandable. The positional relationships described in the drawings are only used for exemplary illustration and cannot be understood as limitations to the present disclosure.

FIG. 1 depicts a stage light fixture with a superimposed color filtering element according to an embodiment of the present disclosure, which includes a light head 100 and a support holder. The light head 100 is pivotally connected to the support holder. The light head 100 is internally provided with a light source 110 for generating a light beam. A color wheel 200 is disposed along the light path of the light beam. The color wheel 200 is fixedly provided with a superimposed color filtering element 210. A driving device is further included for driving the color wheel 200 to rotate and switch the superimposed color filtering element 210 into/out of the light path.

Figure 2:
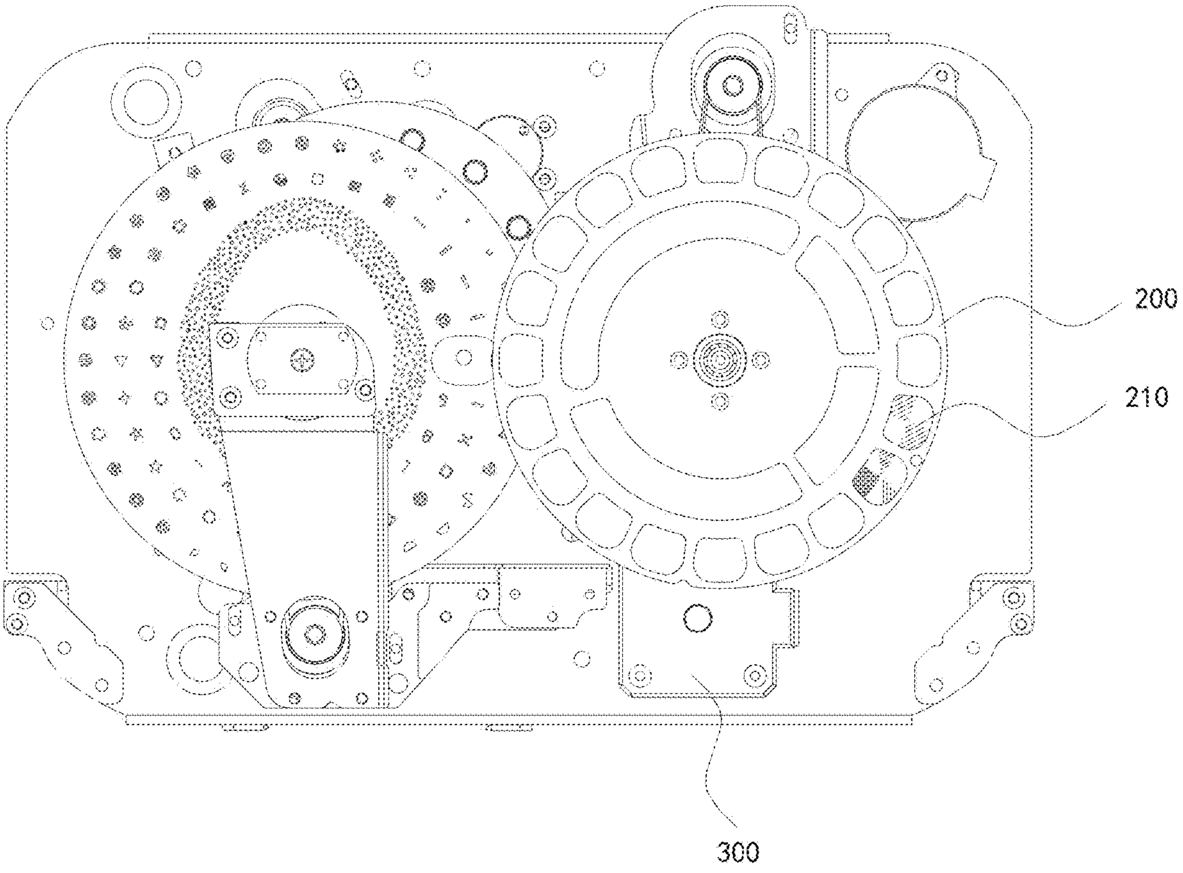
FIG. 2 is a structural schematic view showing a color wheel and a driving device according to an embodiment of the present disclosure.
Figure 5:
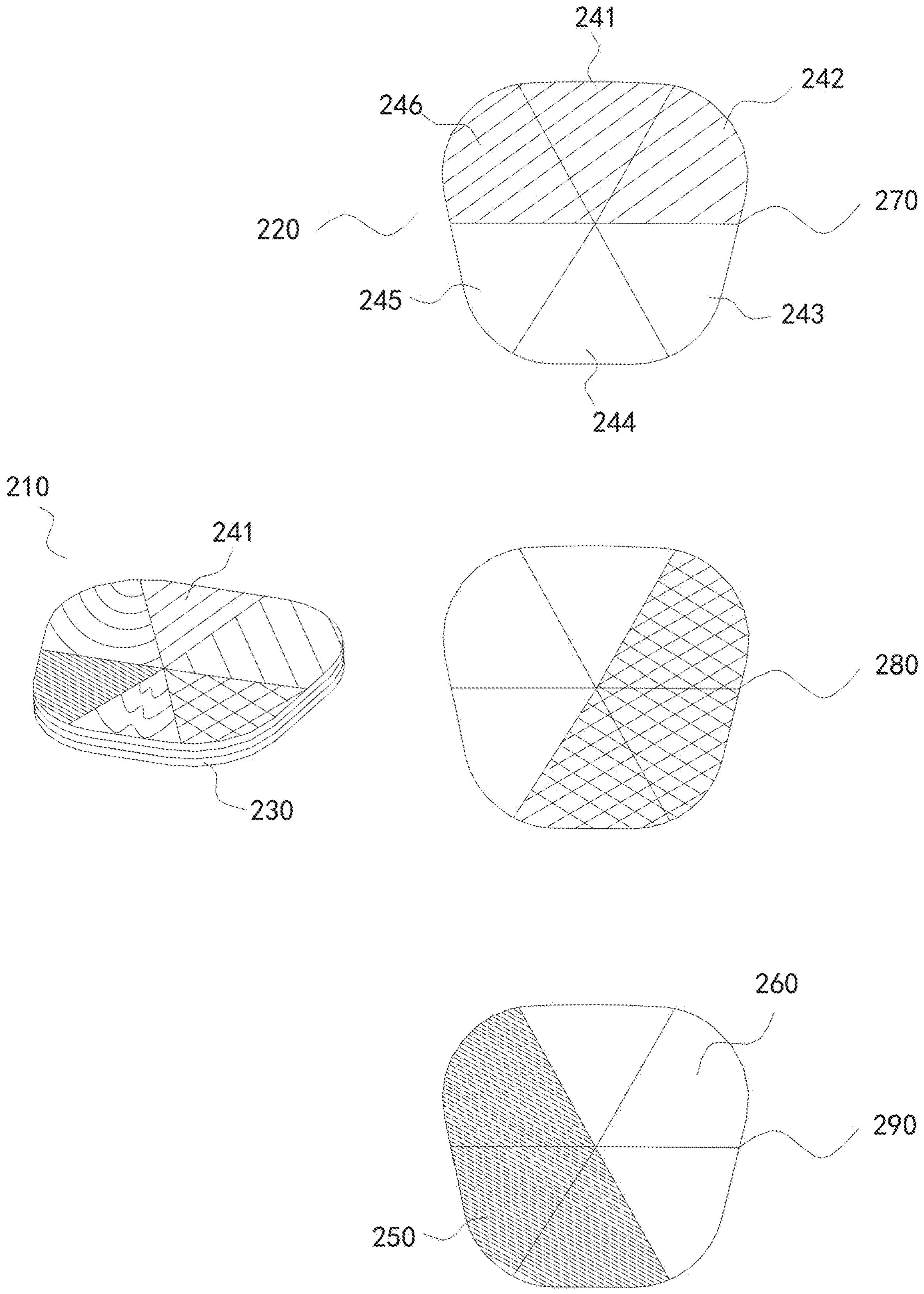
FIG. 5 is a structural schematic view of the superimposed color filtering element according to an embodiment of the present disclosure.

In combination with FIGS. 2 and 5, the superimposed color filtering element 210 particularly includes at least two superimposed color filters 220, each color filter 220 has a transparent substrate 230 and a monochromatic coating layer 240 disposed on at least one side of each transparent substrate 230. Each monochromatic coating layer 240 has a colored region 250 and an uncolored region 260. When the superimposed color filtering element 210 is switched into the light path, the colored regions 250 of at least two monochromatic coating layers 240 are simultaneously positioned in the light path.

The superimposed color filtering element 210 in the present embodiment includes at least two superimposed color filters 220, and each color filter 220 has a transparent substrate 230 and a monochromatic coating layer 240 disposed on at least one side of the transparent substrate 230. Each monochromatic coating layer 240 has a colored region 250 and an uncolored region 260. With at least two color filters 220 in the superimposed configuration, namely positioned one atop the other, the colored regions 250 of different color filters 220 can be superimposed with each other or with uncolored regions 260, thereby creating multiple color combinations. This creates more gorgeous colors during stage performances. Furthermore, since each monochromatic coating layer 240 contains only a single color, the coating process thereof is usually simplified, thus reducing manufacturing costs. The colored regions 250 of different color filters 220 do not affect each other during the coating process, therefore, clear and sharp color separation without black separating lines can be formed in the final light spot projected. Additionally, the design of the regional distribution of colored regions 250 and uncolored regions 260 in the color filters 220 further increases the overall color distribution combinations of the superimposed color filtering element, thereby creating more color effects. In use, the superimposed color filtering element 210 together with the color wheel 200 is driven by the driving device to move and switch into/out of the light path to achieve coloring effects. As shown in FIG. 2, the driving device includes a drive motor 300, which drives the color wheel 200 to rotate and thus brings the superimposed color filtering element 210 to switch into/out of the light path.

Specifically, the uncolored region 260 can be formed by a laser elimination technology on the colored region of the monochromatic coating layer. In this process, mechanical peeling or direct vaporization of the coating material is achieved to form the uncolored region 260, based on local heating, expansion, and cooling caused by indirect thermal effects. The laser elimination technology ensures processing precision through accurate optical system positioning and control, and such non-contact processing method will not damage the color filter 220.

In preferred embodiments of the present disclosure, the color of each monochromatic coating layer 240 is one of cyan, magenta, and yellow, or one of red, green, and blue. The color mixture rule for three primary colors of cyan, magenta, and yellow is based on subtractive color mixing, while the color mixture rule for three primary colors of red, green, and blue is based on additive color mixing. As each set of primary colors provides distinct color contrast, strong visual impact for the audience can be achieved.

More preferably, the color of each monochromatic coating layer 240 is one of cyan, magenta, and yellow.

In preferred embodiments of the present disclosure, the colored region 250 comprises at least one of a dark color unit, a light color unit, and a gradient color unit, or mixture thereof. This allows selection of dark unit or light unit, or a combination of dark and light unit, thus increasing the versatility of color combinations.

Preferably, the light unit can be formed using coating dot technology, which may be colored areas or pattern areas. The pattern and density for the coating dot can be flexibly designed and adjusted according to different application requirements.

Furthermore, the colored region 250 may have a gradient arrangement of the light unit and the dark unit.

Alternatively, the light unit and dark unit in the colored region 250 may be randomly arranged in a mixed pattern to form regular or irregular patterns or textures.

Figure 6:
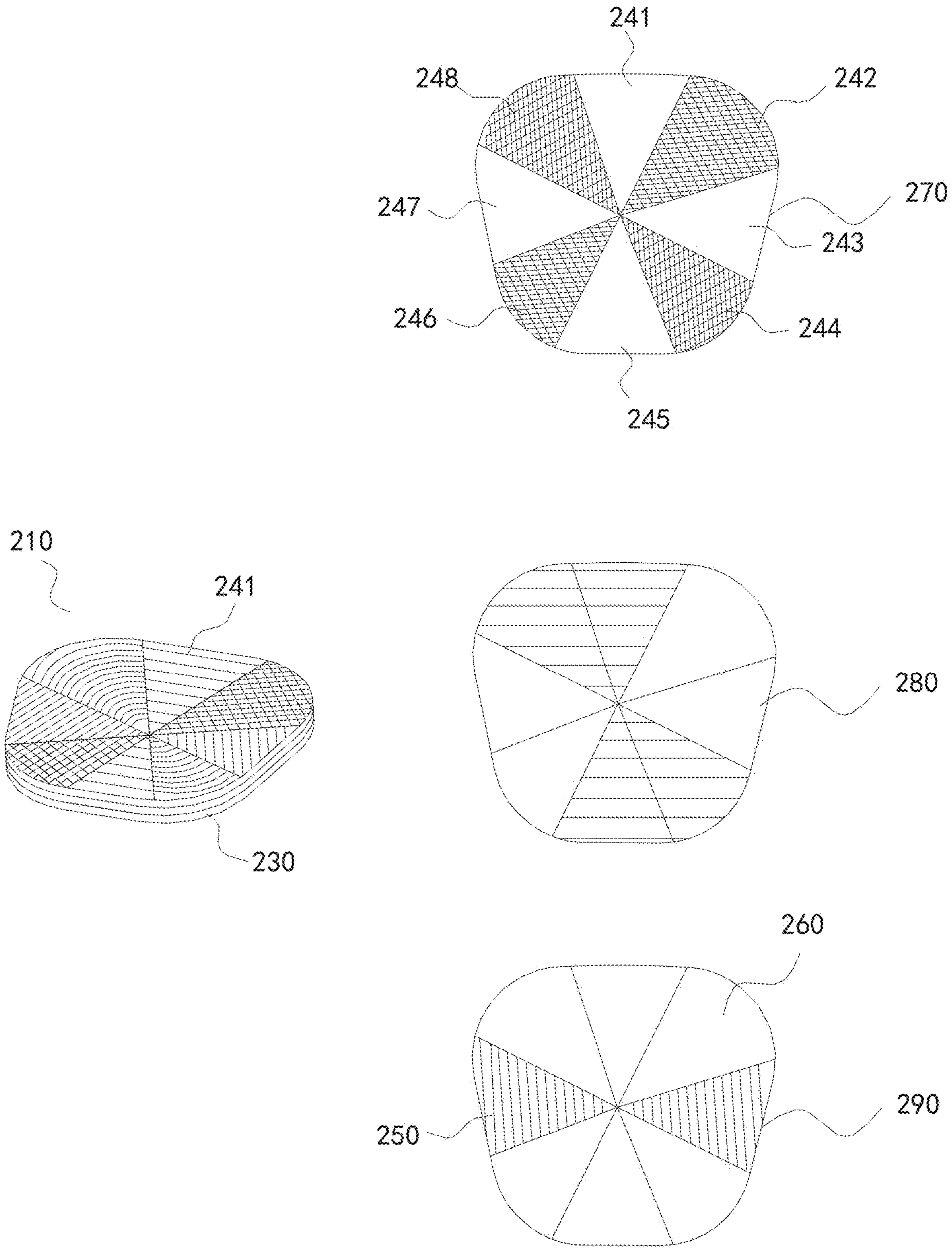
FIG. 6 is a structural schematic view of the superimposed color filtering element according to another embodiment of the present disclosure.
Figure 7:
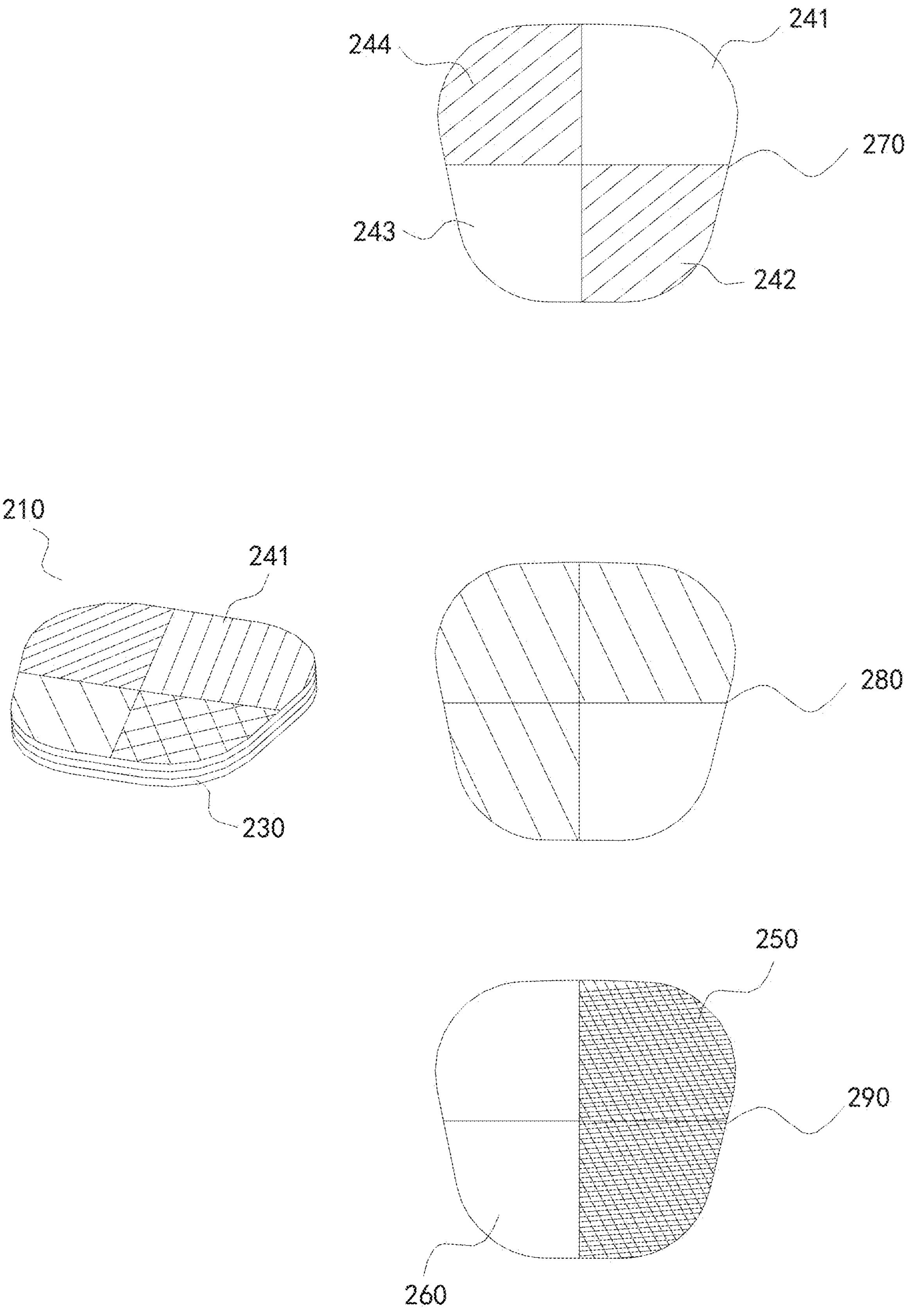
FIG. 7 is a structural schematic view the superimposed color filtering element according to another embodiment of the present disclosure.

Referring now to FIGS. 5 to 7, in preferred embodiments of the present disclosure, the colored region 250 of the monochromatic coating layer 240 is formed with a plurality of sector-like blocks sharing a common vertex. The sector-like block arrangement can provide enhanced visual appeal.

The sector-like blocks in these embodiments are geometric blocks similar to sectors, having a center point (i.e., the common vertex) and starting and ending edges, representing an area corresponding to a circular sector with a center angle less than 360 degrees.

In particular, for the plurality of sector-like blocks sharing the common vertex in the colored region 250, the ending/starting edge of one block is coincided with the starting/ending edge of the adjacent block. Therefore, the plurality of sector-like blocks sharing the common vertex forms a larger sector-like block.

As shown in FIGS. 5 to 7, along the light beam emission direction, the vertices of the sector-like blocks formed by the colored regions 250 of all monochromatic coating layers 240 coincide visually, namely lie in the same line, especially perpendicular to the transparent substrate 230. This ensures that the color blocks of the superimposed color filtering element 210 as a whole have a unified center, making the color distribution clear and organized rather than chaotic.

Preferably, the boundaries of adjacent colored regions 250 of each monochromatic coating layer 240 coincide.

It is preferred that when the superimposed color filtering element 210 is switched into the light beam, the center of the light beam preferably passes through the sector-like blocks formed by the colored regions 250 of the monochromatic coating layer 240. The final light spot exhibits a visual effect where different color regions radiate outward from the center thereof.

Particularly, along the light beam emission direction, no more than two colored regions 250 of the color filtering element 210 are superimposed simultaneously. This ensures precise control of the colors with superimposition of the colored regions 250, avoiding unpredictable color results that might occur with multiple layer superimposition, and simplifies color design and adjustment.

More preferably, in the situation that the light beam is decomposed into multiple parallel minimal light beams, along the emission direction of each minimal light beam, no more than two colored regions 250 of the color filtering element 210 are superimposed.

As shown in FIGS. 5 to 7, in preferred embodiments of the present disclosure, a portion of the colored region 250 on one monochromatic coating layer 240 is superimposed with the colored region 250 on other monochromatic coating layers 240, and the remaining portion of the colored region 250 on the one monochromatic coating layer 240 is superimposed with the uncolored region 260 on all other monochromatic coating layers 240. This enables more diverse color combination methods, enriching the color design arrangement.

Preferably, both sides of the transparent substrate 230 along the light beam emission direction are each provided with a monochromatic coating layer 240. It can achieve clear imaging for all color separations with reducing the number of transparent substrates 230, accordingly reducing the thickness of the superimposed color filtering element 210 and ensuring clear imaging for all color separations.

More preferably, the superimposed color filtering element 210 includes one transparent substrate 230 with a monochromatic coating layer 240 on each side along the light beam emission direction, and one transparent substrate 230 with a monochromatic coating layer 240 on a single side along the light beam emission direction.

Alternatively, the superimposed color filtering element 210 may include two transparent substrates 230, each having a monochromatic coating layer 240 on each side thereof along the light beam emission direction.

In other preferred embodiments of the present disclosure, the superimposed color filtering element 210 includes three superimposed transparent substrates 230, each having a monochromatic coating layer 240 disposed on a single side thereof. That is, three transparent substrates 230 support three monochromatic coating layers 240, which can simultaneously provide three color combinations to present richer color combinations, while maintaining an acceptable thickness for the superimposed color filtering element 210. The process of applying monochromatic coating layer 240 to a single side of each transparent substrate 230 is also simpler.

As shown in FIG. 5, in this embodiment, the superimposed color filtering element 210 includes three superimposed transparent substrates 230 with the monochromatic coating layer 240 disposed on one side of each transparent substrate 230. The three monochromatic coating layers 240 in this embodiment are designated as a first coating layer 270, a second coating layer 280, and a third coating layer 290. Each of the three monochromatic coating layers 240 is divided into six sector-like blocks, designated sequentially as #1 block 241, #2 block 242, #3 block 243, #4 block 244, #5 block 245, and #6 block 246.

Particularly, the color distribution of the superimposed color filtering element 210 from #1 block 241 to #6 block 246 is sequentially: magenta, red, yellow, green, cyan, and blue. The color distribution across the three monochromatic coating layers 240 is as follows: in the first coating layer 270, #1 block 241, #2 block 242, and #3 block 243 form the colored region 250 in magenta; in the second coating layer 280, #2 block 242, #3 block 243, and #4 block 244 form the colored region 250 in yellow; in the third coating layer 290, #4 block 244, #5 block 245, and #6 block 246 form the colored region 250 in cyan.

As shown in FIG. 6, in this embodiment, the superimposed color filtering element 210 includes three superimposed transparent substrates 230 with the monochromatic coating layer 240 disposed on one side of each transparent substrate 230. The three monochromatic coating layers 240 in this embodiment are designated as first a coating layer 270, a second coating layer 280, and a third coating layer 290. Each of the three monochromatic coating layers 240 is divided into eight sector-like blocks, designated sequentially as #1 block 241, #2 block 242, #3 block 243, #4 block 244, #5 block 245, #6 block 246, #7 block 247, and #8 block 248.

Particularly, the color distribution of the superimposed color filtering element 210 from #1 block 241 to #8 block 248 is sequentially: cyan, yellow, magenta, green, cyan, yellow, magenta, and green. The color distribution across the three monochromatic coating layers 240 is as follows: in the first coating layer 270, #2 block 242, #4 block 244, #6 block 246, and #8 block 248 form the colored region 250 in yellow; in the second coating layer 280, #1 block 241, #4 block 244, #5 block 245, and #8 block 248 form the colored region 250 in cyan; in the third coating layer 290, #3 block 243 and #7 block 247 form the colored region 250 in magenta.

As shown in FIG. 7, in this embodiment, the superimposed color filtering element 210 includes three superimposed transparent substrates 230 with the monochromatic coating layer 240 disposed on one side of each transparent substrate 230. The three monochromatic coating layers 240 are designated as a first coating layer 270, a second coating layer 280, and a third coating layer 290. Each of the three monochromatic coating layers 240 is divided into four sector-like blocks, designated sequentially as #1 block 241, #2 block 242, #3 block 243, #4 block 244.

Particularly, the color distribution of the superimposed color filtering element 210 from #1 block 241 to #4 block 244 is sequentially: green, blue, yellow, and red. The color distribution across the three monochromatic coating layers 240 is as follows: in the first coating layer 270, #2 block 242 and #4 block 244 form the colored region 250 in magenta; in the second coating layer 280, #1 block 241, #3 block 243, and #4 block 244 form the colored region 250 in yellow; in the third coating layer 290, #1 block 241 and #2 block 242 form the colored region 250 in cyan.

In combination with FIGS. 1 to 4, in preferred embodiments of the present disclosure, a plurality of superimposed color filtering elements 210 are disposed on the color wheel 200, and the driving device is configured to selectively drive one of the superimposed color filtering elements 210 to switch into the light path. In such configuration, different color combinations and arrangements of superimposed color filtering elements 210 can be simultaneously set on a single color wheel 200, thereby providing more effect options for stage performances.

Preferably, two superimposed color filtering elements 210 are disposed on the color wheel 200.

Adjacent color filters 220 of the superimposed color filtering element 210 are preferably fixed by adhesive bonding at their edges. The adhesive bonding prevents displacement of the color filters 220, and the edge-fixing method ensures that the adhesive does not affect the optical performance of the superimposed color filters 220, resulting in improved aesthetics and reduced installation time and cost.

More preferably, the adjacent color filters 220 are fixed by intermittent adhesive bonding at their edges, which can avoid carbonization and blackening, that might occur in the case of large amounts of adhesive, caused by temperature rises because of the light beam illuminates the color filters 220. Carbonization and blackening of the color filters 220 will block the light beam and affect optical performance.

In addition, a sealing adhesive is provided at the outer periphery of the superimposed color filtering element 210 to seal gaps between the adjacent color filters 220. This prevents dust or other foreign matters from entering the superimposed color filtering element 210, thus avoiding them block the light beam to affect optical performance.

Figure 3:
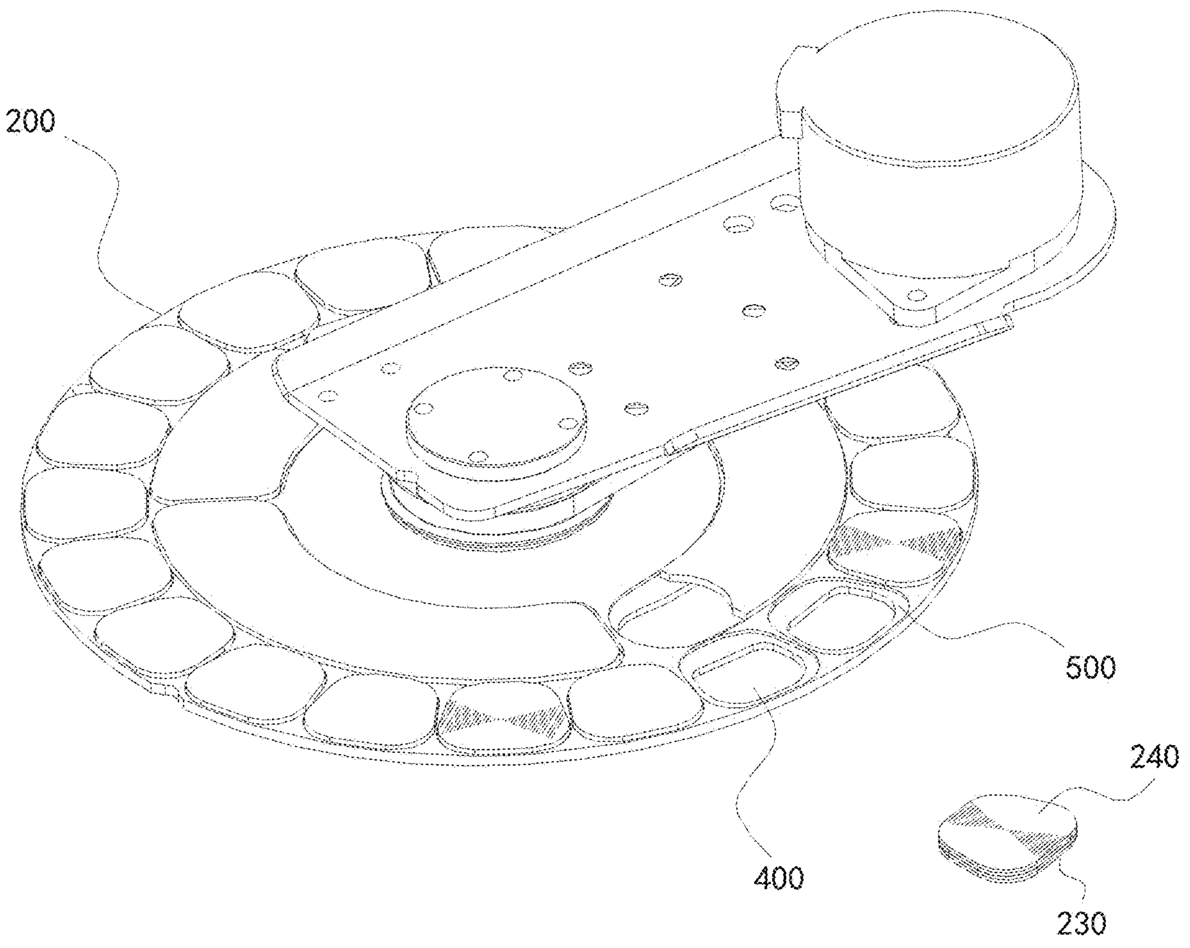
FIG. 3 is a structural schematic view of the color wheel according to an embodiment of the present disclosure.

Referring to FIG. 3, the color wheel 200 in this embodiment has a light-transmitting hole 400 corresponding to each superimposed color filtering element 210, and a positioning groove 500 for receiving the superimposed color filtering element 210 is provided on an inner edge of the light-transmitting hole 400. The superimposed color filtering element 210 is preferably fixed in the positioning groove 500. This facilitates positioning and installation of the superimposed color filtering element 210.

The light-transmitting hole 400 as well as the positioning groove 500 are preferably arranged in a circular distribution around the center of the color wheel 200.

Figure 4:
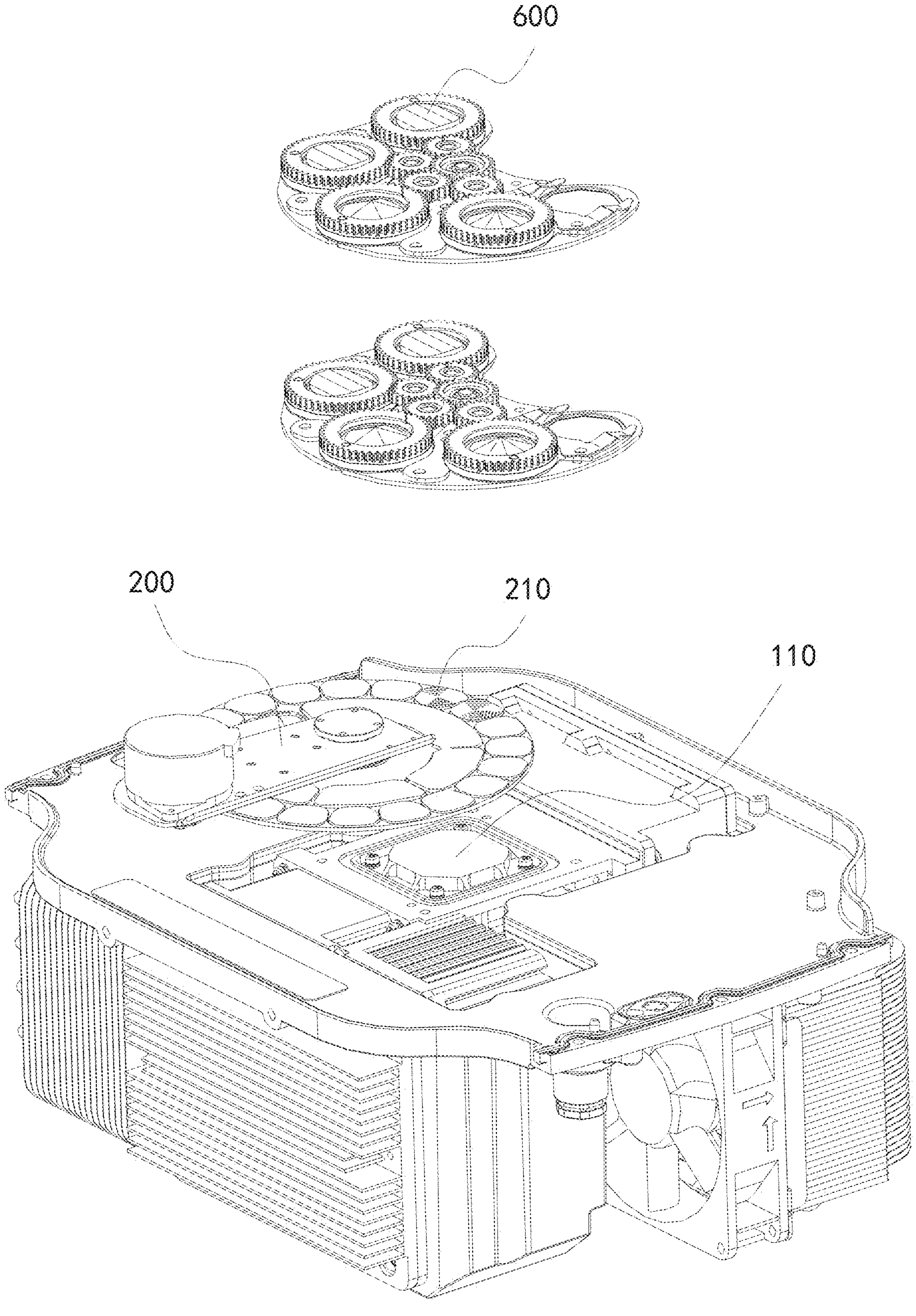
FIG. 4 is an exploded view showing the light source, color wheel, and beam splitter according to an embodiment of the present disclosure.

In combination with FIGS. 1 and 4, the light head 100 is further provided with a beam splitter 600 configured to switch into/out of the light path on the light-emitting side of the color wheel 200. The beam splitter 600 is rotatably fixed on a mounting plate through a pivot seat.

The beam splitter 600 can expand a single light beam into multiple beams to achieve beam splitting or diffusion. The combined use of the beam splitter 600 and the superimposed color filtering element 210 can bring rich and dynamic optical effects for stage performances, thus realizing multi-colored variations and dynamic effects of the light beam.

Preferably, the stage light fixture further includes a swing motor that drives the beam splitter 600 to switch into/out of the light beam.

Additionally or Alternatively, the stage light fixture further includes a rotation motor that drives the beam splitter 600 to rotate about its axis.

As show in FIG. 4, two or more beam splitters 600 are provided, each beam splitter 600 corresponds to one pivot seat, and at least two of the beam splitters 600 are superimposed and simultaneously switched into the light beam. The combination of two or more layers of beam splitters 600 can further enhance light dispersion effect, with superimposed refraction effects of the beam splitters, thereby producing more pronounced spectral separation and displaying more brilliant and rich colors.

Preferably, eight beam splitters are provided and arranged in two layers stacked on top of one another, with two of the beam splitters 600 superimposed and simultaneously switched into the light beam.

Evidently, the above-described embodiments of the present disclosure are merely exemplary for the purpose of clear illustration and should not be construed as limiting the embodiments of the present disclosure. For those skilled in the art, other variations or modifications can be made based on the above description. It is neither necessary nor possible to enumerate all possible embodiments here. Any modifications, equivalent substitutions, and improvements made within the spirit and principles of the present disclosure should be included within the scope of protection of the claims of the present disclosure.

What is claimed is:

1. A stage light fixture with a superimposed color filtering element, having a light head, wherein the light head is internally provided with a light source for generating a light beam, a color wheel is disposed along an emission direction of the light beam and provided with a superimposed color filtering element, and a driving device is further provided for driving the color wheel to rotate and driving the superimposed color filtering element to switch into/out of the light beam, and wherein the superimposed color filtering element comprises at least two superimposed color filters, which are positioned one atop the other, each of the at least two superimposed color filters comprises a transparent substrate, at least one side of the transparent substrate being coated with a monochromatic coating layer, wherein the monochromatic coating layer has a colored region and an uncolored region, and the superimposed color filtering element is configured in a way that at least portion of the colored region of each of at least two monochromatic coating layers is simultaneously switched into the light beam when the superimposed color filtering element is switched into the light beam.

2. The stage light fixture according to claim 1, wherein a color of each monochromatic coating layer is one of cyan, magenta, and yellow, or one of red, green, and blue.

3. The stage light fixture according to claim 1, wherein the colored region comprises at least one of a dark color unit, a light color unit, and a gradient color unit, or mixture thereof.

4. The stage light fixture according to claim 1, wherein the colored region of the monochromatic coating layer forms a plurality of sector-like blocks sharing a common vertex.

5. The stage light fixture according to claim 4, wherein along the emission direction of the light beam, the vertex of each sector-like block formed by the colored region of all monochromatic coating layers of the superimposed color filtering element lie in the same line.

6. The stage light fixture according to claim 4, wherein when the superimposed color filtering element is switched into the light beam, a center of the light beam passes through the vertex of the sector-like blocks formed by the colored region of the monochromatic coating layer of the superimposed color filtering element.

7. The stage light fixture according to claim 1, wherein along the light beam emission direction, no more than two colored regions are superimposed simultaneously.

8. The stage light fixture according to claim 1, wherein a portion of the colored region on one monochromatic coating layer is superimposed with the colored region on other monochromatic coating layer, and a remaining portion of the one colored region is superimposed with all the uncolored regions on the other monochromatic coating layer.

9. The stage light fixture according to claim 1, wherein both sides of the transparent substrate each provides one monochromatic coating layer along the emission direction of the light beam.

10. The stage light fixture according to claim 1, wherein the superimposed color filtering element comprises three superimposed transparent substrates, one side of each transparent substrate being provided with the monochromatic coating layer.

11. The stage light fixture according to claim 1, wherein a plurality of superimposed color filtering elements are disposed on the color wheel, one of the plurality of superimposed color filtering elements is selectively switched into the light beam by the driving device for use.

12. The stage light fixture according to claim 1, wherein adjacent color filters are fixed by adhesive bonding at edges thereof.

13. The stage light fixture according to claim 1, wherein adjacent color filters are fixed by intermittent adhesive bonding at edges thereof.

14. The stage light fixture according to claim 1, wherein a sealing adhesive is provided at an outer periphery of the superimposed color filtering element to seal gaps between adjacent color filters.

15. The stage light fixture according to claim 1, wherein the color wheel has a light-transmitting hole corresponding to the superimposed color filtering element, and a positioning groove is provided on an inner edge of the light-transmitting hole, in which the superimposed color filtering element is fixed.

16. The stage light fixture according to claim 1, wherein the light head is further provided with a beam splitter which is able to be switched into/out of the light beam on a light-emitting side of the color wheel and rotatably fixed on a mounting plate through a pivot seat.

17. The stage light fixture element according to claim 16, wherein two or more beam splitters are provided, each beam splitter corresponds to one pivot seat, and at least two beam splitters are configured to be superimposed and simultaneously switched into the light beam.

* * * * *